United States Patent
Tomohiro

(10) Patent No.: US 8,620,072 B2
(45) Date of Patent: Dec. 31, 2013

(54) IMAGE PROCESSING APPARATUS AND MEDIUM FOR STORING PROGRAM

(75) Inventor: Junji Tomohiro, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 13/211,675

(22) Filed: Aug. 17, 2011

(65) Prior Publication Data

US 2012/0045126 A1    Feb. 23, 2012

(30) Foreign Application Priority Data

Aug. 19, 2010    (JP) .................................. 2010-184352

(51) Int. Cl.
*G06K 9/00* (2006.01)
*G06K 9/34* (2006.01)

(52) U.S. Cl.
USPC ........................................................ 382/167

(58) Field of Classification Search
USPC .......... 382/162, 164, 165, 167; 358/1.15, 1.9, 358/500, 515, 517, 518; 348/223.1
See application file for complete search history.

(56) References Cited

U.S. PATENT DOCUMENTS

| | | | | |
|---|---|---|---|---|
| 5,633,953 | A | * | 5/1997 | Kouzaki .......................... 382/167 |
| 7,671,900 | B2 | * | 3/2010 | Asada .......................... 348/223.1 |
| 7,764,411 | B2 | * | 7/2010 | Kishimoto ...................... 358/518 |
| 2011/0128562 | A1 | | 6/2011 | Anazawa |
| 2012/0045126 | A1 | * | 2/2012 | Tomohiro ...................... 382/167 |
| 2013/0070299 | A1 | * | 3/2013 | Narahashi et al. ........... 358/1.15 |

FOREIGN PATENT DOCUMENTS

JP    2006-339874 A    12/2006

* cited by examiner

*Primary Examiner* — Amir Alavi
(74) *Attorney, Agent, or Firm* — Kilpatrick Townsend & Stockton LLP

(57) ABSTRACT

A hue bar, radio buttons, and slide bars are laid out on an adjustment field of a dropout color setting screen. Hue which is continuously changed is displayed on the hue bar in a band form. The radio buttons correspond to specified color numbers so as to switch specification of a plurality of target colors. Sensitivity and intensity are set on the slide bars. Further, when the radio buttons are switched, a slider corresponding to the switched radio button, that is, the specified color number is switched to be in an active display such that a hue range is capable of being set and sliders corresponding to other specified color numbers are switched to be in a non-active display so that setting of the hue range is accepted. Further, settings of the sensitivity and intensity are accepted so as to be subordinate to the accepted hue range.

8 Claims, 10 Drawing Sheets

FIG. 9

| COLOR | REFERENCE COEFFICIENT FOR COLOR CONVERSION | | |
|---|---|---|---|
| | d1 | d2 | d3 |
| RED, PINK | 1 | 0 | 0 |
| PURPLE | 1 | 0 | 1 |
| BLUE | 0 | 0 | 1 |
| AQUA | 0 | 1 | 1 |
| GREEN | 0 | 1 | 0 |
| YELLOW, ORANGE | 1 | 1 | 0 |

IMAGE PROCESSING APPARATUS AND MEDIUM FOR STORING PROGRAM

CROSS REFERENCES TO RELATED APPLICATIONS

The entire disclosure of Japanese Patent Application No. 2010-184352, filed Aug. 19, 2010 is expressly incorporated by reference herein.

BACKGROUND

1. Technical Field

The present invention relates to an image processing apparatus and a program which accept processing settings including settings of a plurality of target colors for a color conversion processing and instruct to perform color conversion relating to the accepted target colors.

2. Related Art

An existing color conversion instructing apparatus of this type which instructs an image processing apparatus capable of performing a dropout processing of removing a predetermined color in a color image for a target color to be processed has been proposed (for example, JP-A-2006-339874). In this apparatus, a color space is divided into a plurality of color space regions and representative colors of the color space regions are lined up as a color palette and displayed on an acceptance screen. Then, if a representative color is specified from the color palette on the acceptance screen, the apparatus instructs the image processing apparatus to process a color included in a color space region of the specified representative color as a target color to be subjected to the dropout processing.

The above apparatus accepts one representative color selected from the color palette and instructs to process the color. Therefore, the above apparatus cannot accept a plurality of colors as target colors to be subjected to the dropout processing and instruct to process the plurality of colors at once. Accordingly, when the apparatus instructs the image processing apparatus to process a plurality of colors as target colors, the apparatus needs to accept specification of one target color and output an instruction, and then, accept specification of a subsequent target color through the acceptance screen again. This requires a troublesome operation to a user. On the other hand, it can be considered that a plurality of color palettes are lined up and displayed for accepting specification of the plurality of target colors. However, the acceptance screen is increased in size.

SUMMARY

An advantage of some aspects of the invention is to provide an image processing apparatus and a program which accept settings of a plurality of target colors in a color conversion processing with excellent operability while preventing an acceptance screen from increasing in size.

An image processing apparatus and a program according to the aspects of the invention employ the following units in order to achieve the above advantage of some aspects of the invention.

An image processing apparatus according to an aspect of the invention which accepts processing settings including settings of a plurality of target colors for a color conversion processing and instructs to perform color conversion relating to the accepted target colors includes; an acceptance screen display unit which displays an acceptance screen on which a specification switching field on which specification of the plurality of target colors is switched, a hue range setting field constituted by a hue display portion on which hue which is continuously changed is displayed in a band form and a plurality of range setting portions for setting each hue range of the plurality of target colors and a subordinate item setting field on which a subordinate item subordinate to each hue range is set are laid out, a display switching unit which switches a range setting portion corresponding to the switched target color among the plurality of range setting portions on the hue range setting field to be in an active display such that a hue range is capable of being set, switches other range setting portions to be in a display which is different from the active display such that hue ranges are not capable of being set, and switches a display of the subordinate item setting field to a state such that a subordinate item corresponding to the range setting portion switched to be in the active display is capable of being set, when the specification of the target colors on the specification switching field is switched, and a setting acceptance unit which accepts setting of a hue range by using the range setting portion switched to be in the active display on the hue range setting field and accepts setting of a subordinate item on the subordinate item setting field so as to be subordinate to the accepted setting of the hue range. In the image processing apparatus, on the acceptance screen, the specification switching field and the subordinate item setting field are laid out on a region in the direction perpendicular to a lengthwise direction of the band-form hue display portion.

In the image processing apparatus according to the aspect of the invention, the hue range setting field constituted by the hue display portion on which hue which is continuously changed is displayed in a band form and the plurality of range setting portions for setting each hue range of the plurality of target colors is laid out on the acceptance screen. Further, the specification switching field on which specification of the plurality of target colors is switched and the subordinate item setting field on which the subordinate item subordinate to each hue range is set are laid out on the acceptance screen on a region in the direction perpendicular to the lengthwise direction of the hue display portion. Further, the range setting portion corresponding to the switched target color among the plurality of range setting portions on the hue range setting field is switched to be in an active display such that a hue range can be set and other range setting portions are switched to be in a display which is different from the active display such that hue ranges cannot be set, and the setting of the hue range is accepted, when the specification of the target colors on the specification switching field is switched. Further, a display of the subordinate item setting field is switched to a state such that a subordinate item corresponding to the range setting portion which has been switched to be in the active display can be set and the setting of the subordinate item is accepted so as to be subordinate to the accepted setting of the hue range. With this, the settings of the hue ranges of the plurality of target colors and the settings of the subordinate items subordinate to the hue ranges can be accepted through one acceptance screen. Further, the hue display portion on which hue is displayed in a band form is used. Therefore, a required space when a plurality of target colors are specified can be saved in comparison with a case where a hue circle in which hue is circularly displayed is used or a hue is displayed in a palette form. Accordingly, the acceptance screen can be prevented from increasing in size. As a result, settings of the plurality of target colors to be subjected to the color conversion processing can be accepted with excellent operability while preventing the acceptance screen from increasing in size. As the color conversion processing, a dropout processing of removing a target color from a color image, a color enhancement processing of enhancing a target color on the contrary to the dropout processing, and the like are exemplified.

In the image processing apparatus according to the aspect of the invention, it is preferable that on the acceptance screen, two boundaries in pairs indicating positions at both ends of the hue range be laid out for each of the plurality of range setting portions on the hue display portion, the display switching unit be a switching unit which switches to a display on which each of the two boundaries in pairs is slidable on an entire range on the hue display portion including ranges overlapping with other hue ranges set by the range setting portions in the display which is different from the active display as the active display of the range setting portion, and the setting acceptance unit be an acceptance unit which accepts setting in which a range sandwiched between the two boundaries in pairs including the ranges overlapping with the other hue ranges is set as the hue range. With this, specification of the target colors can be accepted while the hue ranges are permitted to overlap with each other. Therefore, different subordinate items can be set in the overlapping hue ranges. In the image processing apparatus according to the aspect of the invention, it is preferable that on the acceptance screen, the hue display portion be formed such that hue is continuous from one end to the other end, the display switching unit be a switching unit which switches a display such that when one boundary of the two boundaries in pairs switched to the slidable display is slid beyond one end of the hue display portion, the one boundary is displayed at the other end side of the hue display portion, and the setting acceptance unit be an acceptance unit which accepts setting in which a range from the other end to the one boundary and a range from the one end to the other boundary are set as the hue range. With this, even if the band-form hue display portion is used in order to save the space, continuity of the hue is not interrupted at the both ends of the hue display portion. Accordingly, operability is not deteriorated.

Further, in the image processing apparatus according to the aspect of the invention, it is preferable that on the acceptance screen, the subordinate item setting field be laid out as a field which is commonly used for settings of each of the hue ranges, and the setting acceptance unit be an acceptance unit which accepts a subordinate item set by using the commonly used subordinate item setting field as an item subordinate to the hue range set by the range setting portion switched to be in the active display. With this, a space required for the subordinate item setting field can be saved. Therefore, the acceptance screen can be prevented from increasing in size.

The image processing apparatus according to any one of the above aspects of the invention instructs to perform color conversion relating to the target color when hue and lightness are acquired from a gradation value of a pixel constituting a color image and a color conversion processing is performed on a pixel in which the acquired hue corresponds to the hue range of the set target color as a target pixel to be processed using the acquired lightness. In the image processing apparatus, on the acceptance screen, an item which is capable of adjusting lightness of the pixel as the target pixel to be processed for each of the hue ranges be laid out as the subordinate item setting field. Note that the adjustment of the lightness includes adjustment of sensitivity.

A program according to another aspect of the invention is a program for making a computer function as the image processing apparatus according to any one of the above aspects of the invention. The program may be recorded in a recording medium (for example, a hard disc, ROM, FD, CD, DVD, or the like) which can be read by a computer, may be delivered from a computer to another computer through a transmission medium (communication network such as the Internet and a LAN) or may be transmitted and received in any other forms. If the program is made to be executed by the computer, the same effects as those obtained by the above image processing apparatus can be obtained.

BRIEF DESCRIPTION OF THE DRAWINGS

The invention will be described with reference to the accompanying drawings, wherein like numbers reference like elements.

FIG. 9 is a descriptive view illustrating an example of reference coefficients for color conversion.

DESCRIPTION OF EXEMPLARY EMBODIMENTS

Figure 1:
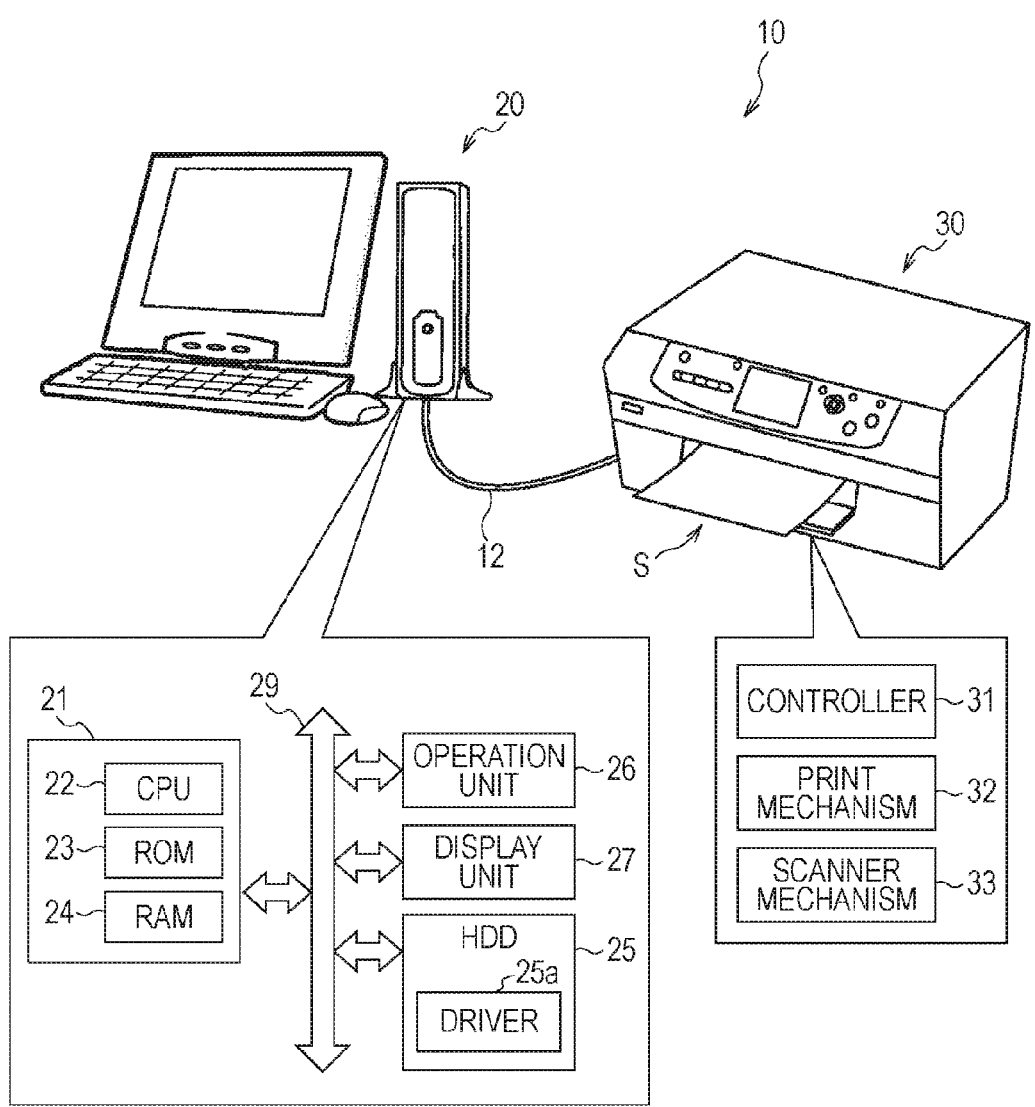
FIG. 1 is a configuration view illustrating a schematic configuration of a scan system.

Hereinafter, embodiments of the invention are described with reference to drawings. FIG. 1 is a configuration view illustrating a schematic configuration of a scan system 10 as an embodiment of the invention. The scan system 10 according to the embodiment includes a user computer (user PC) 20 and a printer 30 connected to the user PC 20 through a USB cable 12.

The user PC 20 includes a controller 21, a hard disc drive (HDD) 25, an operation unit 26 such as a keyboard and a mouse, and a display unit 27 as a display. The controller 21 includes a CPU 22 which executes various types of control, a ROM 23 which stores various control programs, a RAM 24 which temporarily stores data, and the like. The hard disc drive (HDD) 25 stores various application programs, various divers, data files and the like. The user PC 20 is a general personal computer in which the above components are electrically connected via a bus 29. A driver (printer driver and scanner driver) 25a is stored in the HDD 25 of the user PC 20. The driver 25a is used for various settings relating to transmission and reception of data such as print data and scan data between the user PC 20 and the printer 30, a printing processing, and a scanning processing. The driver 25a has a dropout function and a color enhancement function at the time of a scanning processing. The dropout function is a function of performing a so-called dropout processing of removing a specific color. The color enhancement function is a function of performing a so-called color enhancement processing of enhancing a specific color on the contrary to the dropout processing.

The printer 30 includes a controller 31, a print mechanism 32 and a scanner mechanism 33. The controller 31 controls the entire apparatus. The print mechanism 32 performs printing by discharging ink as colorant onto a sheet S. The scanner mechanism 33 generates image data by optically reading a document placed on a document table (not illustrated). The printer 30 is a multifunctional printer in which the above components are electrically connected via a bus (not illustrated). It is to be noted that the print mechanism 32 is configured as a well-known ink jet color printer mechanism which performs printing by discharging ink of each color including cyan (C), magenta (M), yellow (Y) and black (B) onto the sheet S through a print head (not illustrated). Further, the scanner mechanism 33 is configured as a well-known image scanner and includes a well-known color image sensor. The color image sensor generates RGB data by resolving reflection light from the document, onto which light has been emitted, into each color of red (R), green (G), and blue (B) as a scan image. It is to be noted that in the RGB data, pixels are arranged both in the horizontal and vertical directions in a matrix pattern and each value of the arranged pixels is represented by 256 gradations (8 bits) of values 0 to 255 in accordance with density.

Figure 2:
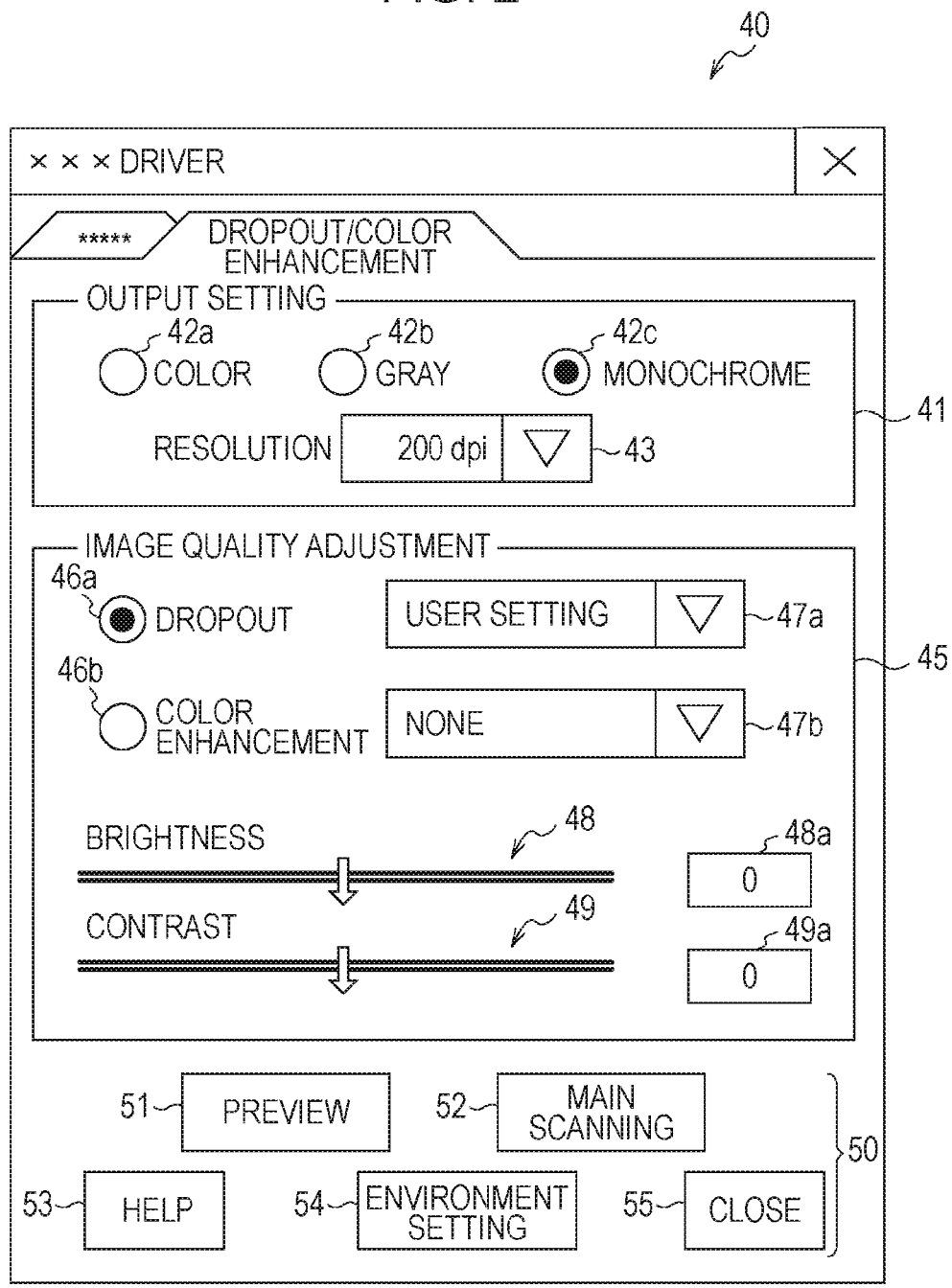
FIG. 2 is a descriptive view illustrating an example of an image quality adjustment screen.

Next, operations of the scan system 10 according to the embodiment which is configured as described above are described. In particular, operations of the scan system 10 when the scan system 10 performs a scanning processing with a dropout processing are described. If a scanning processing is selected by an operation on the operation unit 26 by a user, the CPU 22 of the user PC 20 reads out the driver 25a from the HDD 25 and makes the display unit 27 display a main screen. If a "dropout/color enhancement" tab is selected on the main screen, the CPU 22 of the user PC 20 switches the main screen to an image quality adjustment screen 40. FIG. 2 is a descriptive view illustrating an example of the image quality adjustment screen 40. It is to be noted that although the main screen is switched to the image quality adjustment screen 40 by selecting the "dropout/color enhancement" tab in the embodiment, a screen configuration in which the image quality adjustment screen 40 is included in the main screen may be employed. Hereinafter, the image quality adjustment screen 40 is described.

The image quality adjustment screen 40 includes an output setting field 41, an image quality adjustment field 45, and a button group 50. Output of image data which has been subjected to the scanning processing is set on the output setting field 41. Image quality of the image data is adjusted on the image quality adjustment field 45. The button group 50 is constituted by various buttons. Radio buttons 42a to 42c and a list box 43 are laid out on the output setting field 41. Whether a color, gray or black and white image is output can be selectively set with the radio buttons 42a to 42c. Resolution of an output image can be set in a pull-down manner on the list box 43. Setting on the output setting field 41 is registered in the RAM 24 by the CPU 22. Further, radio buttons 46a, 46b, a list box 47a, a list box 47b, a brightness slide bar 48, and a contrast slide bar 49 are laid out on the image quality adjustment field 45. Whether the dropout processing or the color enhancement processing is performed can be selectively set with the radio buttons 46a, 46b. A target color to be subjected to the dropout processing can be set in a pull-down manner on the list box 47a. A target color to be subjected to the color enhancement processing can be set in a pull-down manner on the list box 47b. Brightness of an output image can be adjusted on the brightness slide bar 48 and an adjustment value thereof is displayed on a numerical value box 48a. Contrast of an output image can be adjusted on the contrast slide bar 49 and an adjustment value thereof is displayed on a numerical value box 49a. It is to be noted that on the brightness slide bar 48 and the contrast slide bar 49, brightness and contrast can be also set by inputting a numerical value onto each of the numerical value boxes 48a, 49a. Further, a preview button 51, a main scanning button 52, a help button 53, an environment setting button 54, and a close button 55 are laid out on the button group 50. The preview button 51 is a button for previewing a scan image. The main scanning button 52 is a button for performing main scanning. The help button 53 is a button for reading out a help screen. The environment setting button 54 is a button for performing various environment settings. The close button 55 is a button for finishing the processing.

Figure 3:
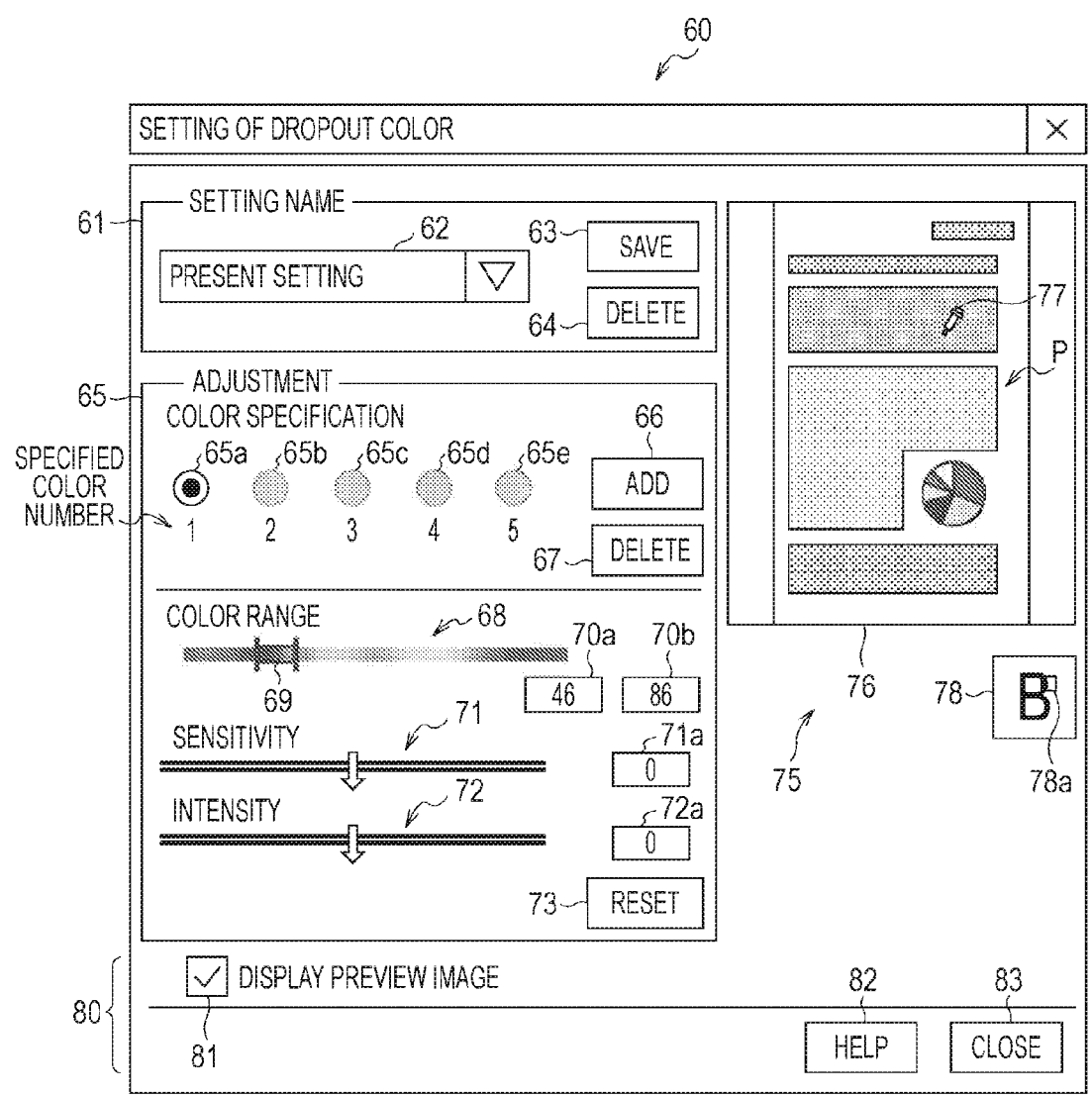
FIG. 3 is a descriptive view illustrating an example of a dropout color setting screen.

Defined colors such as red, blue and green and "user setting" color which a user can customize can be selected as a target color on each of the list boxes 47a, 47b for setting the target color to be subjected to the dropout processing or the color enhancement processing. If the "user setting" is selected on the list box 47a for setting the target color to be subjected to the dropout processing, the CPU 22 reads out a dropout color setting screen 60 and makes the display unit 27 display the dropout color setting screen 60. FIG. 3 is a descriptive view illustrating an example of the dropout color setting screen 60. Hereinafter, the dropout color setting screen 60 is described. It is to be noted that if an image has not been previously scanned when the dropout color setting screen 60 is read out, the CPU 22 outputs a scanning instruction to the scanner mechanism 33 of the printer 30 to previously scan the image. Further, if the "user setting" is selected on the list box 47b for setting the target color to be subjected to the color enhancement processing, a color enhancement color setting screen is displayed. Since the color enhancement color setting screen is a screen similar to the dropout color setting screen 60, the color enhancement color setting screen is not illustrated and description thereof is omitted.

The dropout color setting screen 60 includes a setting registration field 61, an adjustment field 65, an extraction field 75, and a button group 80. A registered color setting is invoked and a new color setting is registered on the setting registration field 61. Specification of a plurality of target colors to be subjected to the dropout processing is switched, a hue range for each target color is adjusted, and sensitivity and intensity for the adjusted hue range are adjusted on the adjustment field 65. The extraction field is a field for extracting a target color from an image to be processed. The button group 80 is constituted by various buttons.

A list box 62, a save button 63, and a delete button 64 are laid out on the setting registration field 61. Registered color setting can be selected in a pull-down manner on the list box 62. The save button 63 is a button for registering a present color setting. The delete button 64 is a button for deleting a registered color setting from a pull-down menu on the list box 62. If a setting name is input by an operation on the operation unit 26 by a user and the save button 63 is pressed (clicked) on the setting registration field 61, the CPU 22 stores setting contents of the adjustment field 65 at this time in a predetermined region of the HDD 25. With this, the setting contents can be read out from the pull-down menu on the list box 62 thereafter. Further, radio buttons 65a to 65e, an add button 66, a delete button 67, a band-form hue bar 68, a slider 69, a numerical value box 70a, a numerical value box 70b, a sensitivity slide bar 71, an intensity slide bar 72, and a reset button 73 are laid out on the adjustment field 65. Specification of target colors corresponding to specified color numbers (in the embodiment, values 1 to 5) can be switched with the radio buttons 65a to 65e. The add button 66 is a button for specifying a new target color. The delete button 67 is a button for deleting setting of the specified target color. Hue ranging from 0° to 360° is continuously displayed on the hue bar 68.

The hue is continuous from one end to the other end of the hue bar 68. The slider 69 can set a range which is displayed so as to overlap with the hue bar 68 and is sandwiched by two boundaries indicating both ends as a hue range of a target color. A position of the boundary of the slider 69 at the left end is displayed on the numerical value box 70a. A position of the boundary of the slider 69 at the right end is displayed on the numerical value box 70b. Sensitivity can be adjusted on the sensitivity slide bar 71 and an adjustment value thereof is displayed on a numerical value box 71a. Intensity can be adjusted on the intensity slide bar 72 and an adjustment value thereof is displayed on a numerical value box 72a. The reset button 73 is a button for resetting various settings. It is to be noted that the slider 69 can set a hue range by sliding each of the two boundaries and the hue range can be also set by inputting a numerical value onto each of the numerical value boxes 70a, 70b. In the same manner, on the sensitivity slide bar 71 and the intensity slide bar 72, sensitivity and intensity can be also set by inputting a numerical value onto each of the numerical value boxes 71a, 72a. A preview region 76, an extraction icon 77 and an enlarged display region 78 are laid out on the extraction field 75. An image which has been previously scanned is displayed as a preview image P on the preview region 76. The extraction icon 77 is a dropper-like icon for extracting (selecting) a desired color from the preview image P displayed on the preview region 76. An extraction position 78a selected by the extraction icon 77 is enlarged and displayed on the enlarged display region 78. Further, a check box 81, a help button 82, and a close button 83 are laid out on the button group 80. The check box 81 makes it possible to instruct to display the preview image P on the preview region 76 by checking the check box 81. The help button 82 is a button for reading out a help screen. The close button 83 is a button for closing the dropout color setting screen 60.

If the add button 66 is pressed by an operation on the operation unit 26 by a user, the CPU 22 switches to an unregistered radio button among the radio buttons 65a to 65e. Further, if the extraction icon 77 is operated and a color which is desired to be dropped out by the user is selected from the preview image P, the slider 69 having a range corresponding to the selected color is newly displayed on the hue bar 68. In this case, the range corresponding to the color selected by the extraction icon 77 can be set to a predetermined range as follows. That is, hue is acquired from RGB data of pixels included in the extraction position 78a and a histogram thereof is created. Then, the range can be set to the predetermined range in which a peak value of the hue in the created histogram is set as a center. It is to be noted that the acquisition of the hue from the RGB data will be described later. As described above, in the embodiment, the slider 69 is displayed on the hue bar 68 when color has been selected from the preview image P by the user. Therefore, a target color closer to a desired color can be selected in comparison with a case in which color is simply selected from a color palette or the like. In the embodiment, five colors of specified color numbers 1 to 5 at maximum can be set as target colors to be subjected to the dropout processing. A hue range corresponding to each target color of the specified color numbers 1 to 5 can be set using the slider 69 upon switching of the radio buttons 65a to 65e. It is to be noted that although five colors at maximum can be set in the embodiment, a configuration in which equal to or more than six colors can be set may be employed. Hereinafter, settings of hue ranges of the plurality of target colors are described. FIGS. 4A through 4D are descriptive views illustrating a state where the hue ranges of the plurality of target colors are set. In FIGS. 4A through 4D, a state where three colors of specified color numbers 1 to 3 are set using the radio buttons 65a to 65c is illustrated. In FIGS. 4A through 4D, hue ranges HR1 to HR3 denote hue ranges corresponding to the specified color numbers 1 to 3, respectively.

Figure 4A:
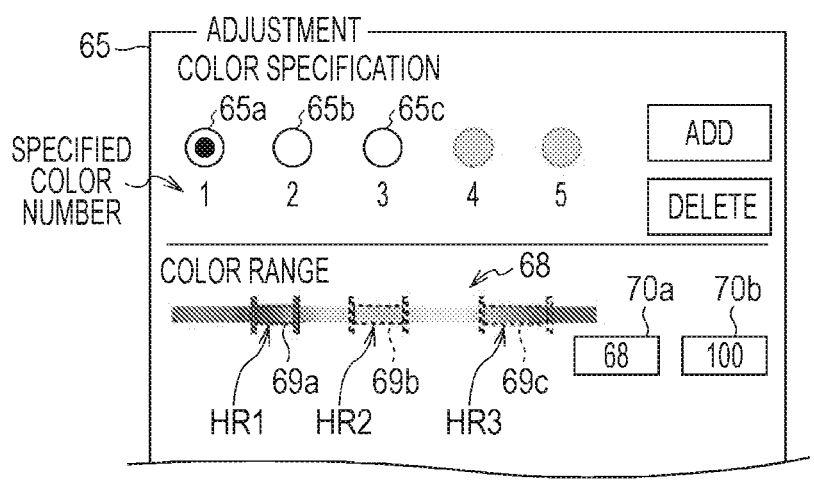
FIGS. 4A through 4D are descriptive views illustrating a state where hue ranges of a plurality of target colors are set.

At first, as illustrated in FIG. 4A, when the radio button 65a corresponding to the specified color number 1 is selected, a slider 69a corresponding to the specified color number 1 is made to be in an active display as indicated by solid lines in the drawing by the CPU 22. Therefore, the boundaries of the slider 69a at the both ends are slid by an operation on the operation unit 26 by the user so that the hue range HR1 of the specified color number 1 can be set. Further, numerical values corresponding to the boundaries of the slider 69a at the both ends are displayed on the numerical value boxes 70a, 70b. On the other hand, the radio buttons 65b, 65c corresponding to the specified color numbers 2, 3 are not selected. Therefore, sliders 69b, 69c corresponding to the specified color numbers 2, 3 are made to be in a non-active display as indicated by dashed lines in the drawing. Accordingly, the boundaries of the sliders 69b, 69c at the both ends cannot be slid and the hue range HR2 and the hue range HR3 cannot be set. At this time, the slider 69a in the active display can slide on the entire range on the hue bar 68 including other hue ranges HR2, HR3.

Figure 4B:
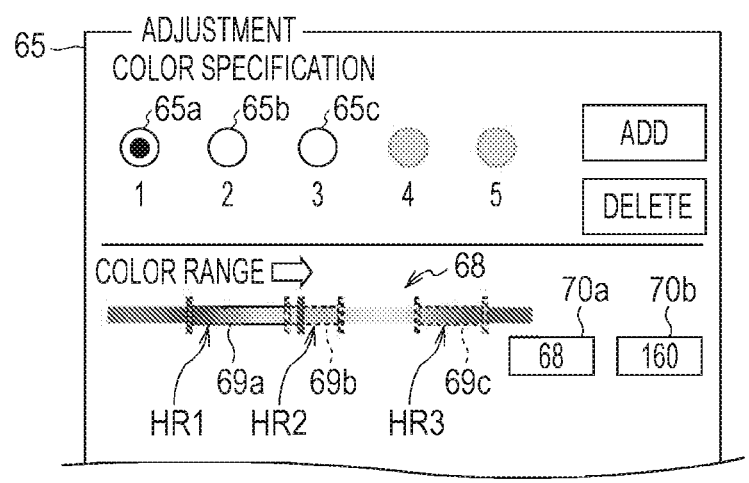

Next, as illustrated in FIG. 4B, if the boundary of the slider 69a at the right end in the drawing is slid from the state as illustrated in FIG. 4A, the hue range HR1 is extended in the right direction and a value on the numerical value box 70b is changed. At this time, the extended hue range HR1 overlaps with the hue range HR2. In the embodiment, the hue ranges HRs are permitted to overlap with each other as in the above case and the CPU 22 accepts a range including a range overlapping with other hue ranges as the hue range HR1 of the specified color number 1 and registers the accepted range in the RAM 24. It is to be noted that in the embodiment, a range specified by boundaries of each slider 69 at both ends is accepted and registered as it is as the hue range HR. Further, although not illustrated in FIGS. 4A through 4D, when adjustment of sensitivity by the sensitivity slide bar 71 and adjustment of intensity by the intensity slide bar 72 have been made, the CPU 22 accepts the sensitivity and the intensity as a sensitivity parameter Ts and an intensity parameter Td and registers the sensitivity parameter Ts and the intensity parameter Td so as to be subordinate to the hue range HR1. It is to be noted that when these adjustments have not been made, a default value is registered for each parameter.

Figure 4C:
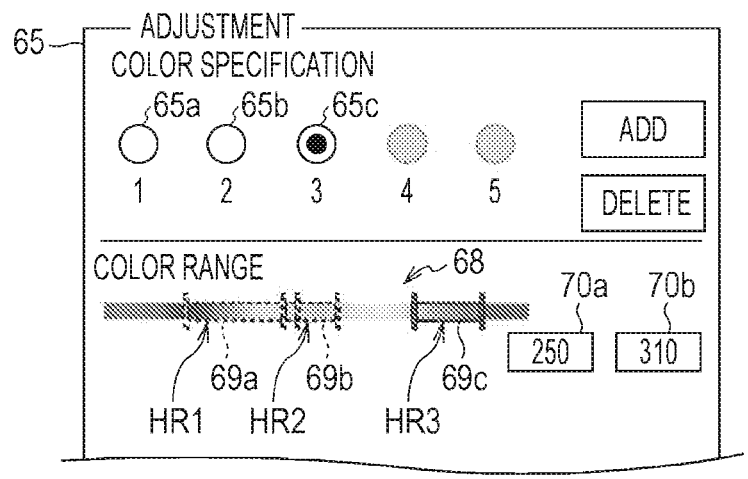

Further, as illustrated in FIG. 4C, if the color number selection is switched from the radio button 65a to the radio button 65c corresponding to the specified color number 3, the slider 69a is switched to be in the non-active display from the active display by the CPU 22 and the slider 69c corresponding to the specified color number 3 is switched to be in the active display from the non-active display. It is to be noted that the slider 69b is kept to be in the non-active display. Further, displays on the numerical value boxes 70a, 70b are switched to numerical values corresponding to the boundaries of the slider 69c at the both ends, respectively. With this, the hue range HR3 of the specified color number 3 can be set by the slider 69c. If the sensitivity and the intensity have been adjusted, the sensitivity parameter Ts and the intensity parameter Td can be registered so as to be subordinate to the hue range HR3. In this manner, each of the hue ranges HR1 to HR3 set by each of the sliders 69a to 69c can be registered and the sensitivity parameter Ts and the intensity parameter Td can be registered so as to be subordinate to each of the hue ranges HR1 to HR3. Such a plurality of hue ranges are set by using the band-form hue bar 68 and the sliders 69 displayed so as to overlap with the hue bar 68. Further, the radio buttons 65a to 65e, the sensitivity slide bar 71, and the intensity slide bar 72 are laid out on the adjustment field 65 on a region in the direction perpendicular to the lengthwise direction of the band-form hue bar 68. With these configurations, even when a plurality of target colors can be specified, effective layout can be realized in comparison with a case where a hue circle in which hue is circularly displayed is used or hue is displayed in a palette form. Accordingly, a space required for the adjustment field 65 can be saved. Further, as for the adjustments of the sensitivity and the intensity, the sensitivity slide bar 71 and the intensity slide bar 72 are commonly used for each of hue ranges of the plurality of target colors. Therefore, the space required for the adjustment field 65 can be further saved. Accordingly, the dropout color setting screen 60 can be prevented from increasing in size. In addition, the hue ranges HR1 to HR3 are permitted to overlap with each other. Therefore, different values can be set to the sensitivity parameter Ts and the intensity parameter Td in the overlapping hue ranges HRs.

Figure 4D:
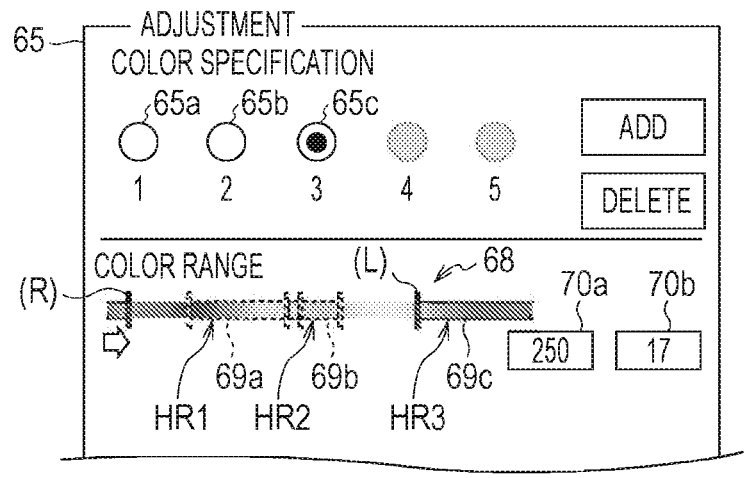

Further, if the boundary at the right end in the drawing is slid to the right side beyond the right end of the hue bar 68 on the slider 69c which is made to be in the active display, the CPU 22 displays the boundary at the right end (expressed by (R) in FIG. 4D) on the left end side of the hue bar 68 as illustrated in FIG. 4D. Note that the hue is continuous from one end to the other end on the hue bar 68 as described above. Therefore, in the case as illustrated in FIG. 4D, the CPU 22 can accept the hue range HR3 as a range in which the hue is continuous. The hue range HR3 is a range obtained by combining a range from a boundary of the slider 69c at the left end (expressed by (L) in FIG. 4D) to the right end of the hue bar 68 and a range from the boundary of the slider 69c at the right end to the left end of the hue bar 68. Thus, even when a band-form bar is used as the hue bar 68, continuity of the hue is not interrupted at both the ends of the hue bar 68. This makes it possible to set the hue range HR with excellent operability.

Figure 5:
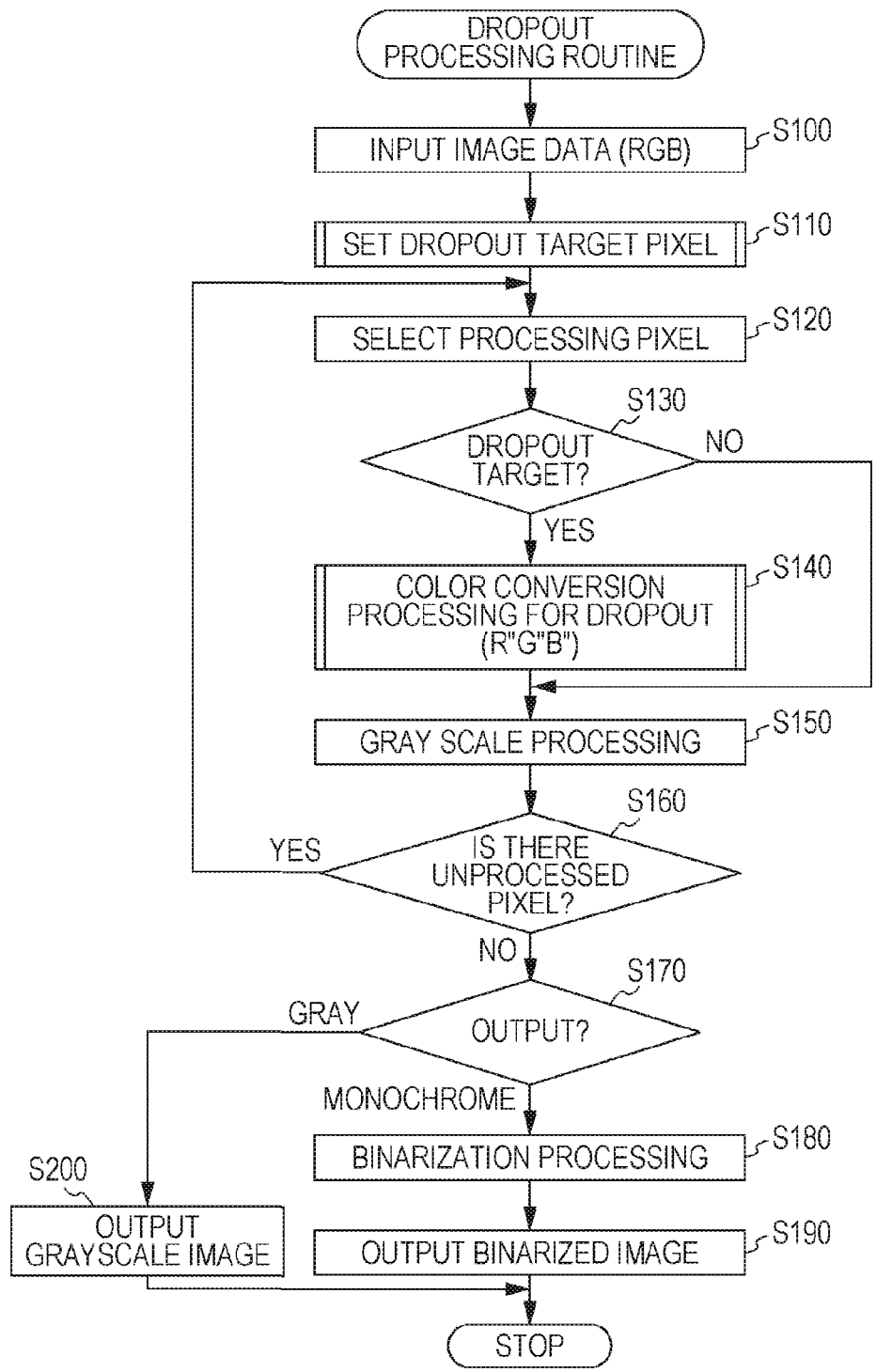
FIG. 5 is a flowchart illustrating an example of a dropout processing routine.

If settings of the target colors to be subjected to the dropout processing have been accepted in the above manner and the close button 83 is pressed, the CPU 22 closes the dropout color setting screen 60. Then, if the main scanning button 52 is pressed on the image quality adjustment screen 40, the dropout processing is started. The dropout processing routine is read out by the CPU 22 so that the processing is executed. FIG. 5 is a flowchart illustrating an example of the dropout processing routine. It is to be noted that in the embodiment, a case where gray or monochrome is set as an output image on the output setting field 41 of the image quality adjustment screen 40 is described.

Figure 6:
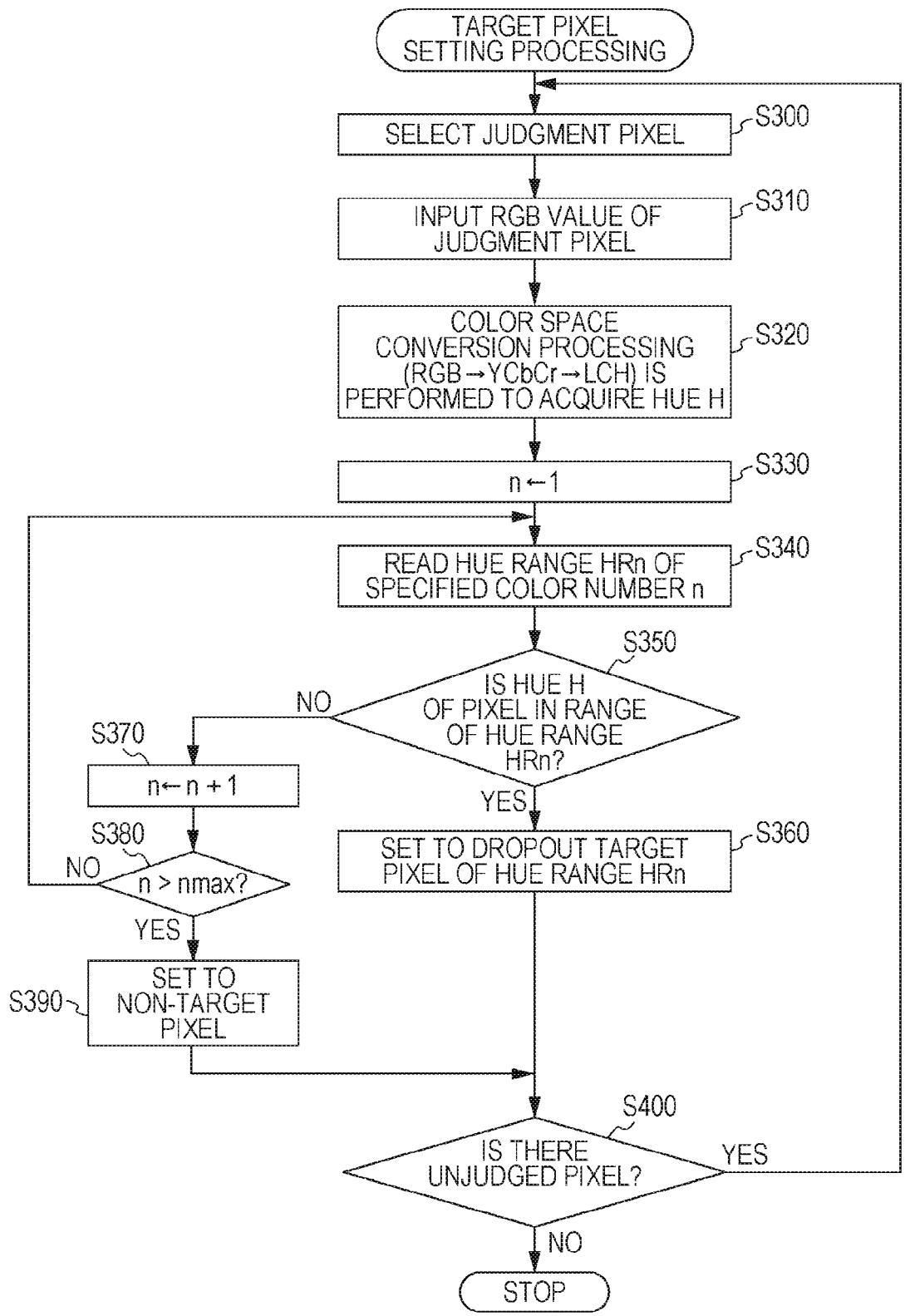
FIG. 6 is a flowchart illustrating an example of a setting processing of a target pixel.

If the routine is started, the CPU 22 at first inputs image data (RGB data) (step S100). At this time, when the main scanning button 52 has been pressed, a scanning instruction has been output to the scanner mechanism 33 of the printer 30 and image data which has been scanned by the scanner mechanism 33 driven upon the reception of the scanning instruction is input. It is to be noted that image data which has been previously scanned or the like may be input. If the image data has been input, a dropout target pixel to be subjected to the dropout processing is set (step S110). The processing is performed by the setting processing of the target pixel as illustrated in FIG. 6. The description of the dropout processing routine is suspended and the setting processing of the target pixel is described.

In the setting processing of the target pixel, at first, a judgment pixel is selected (step S300) and an RGB value of the selected judgment pixel is input (step S310). The judgment pixel is selected in the following manner. That is, pixels are selected in the right direction in the order from a pixel at an upper left position in pixels constituting image data. Then, if all the pixels have been selected in the right direction, pixels are selected in the right direction in the order from a pixel at a left end position on the next line below. Next, a color space conversion processing is performed on the input RGB value so as to acquire hue H (step S320). At this time, the hue H can be acquired from the RGB value as follows. That is, gradation values of the RGB color system are converted to the YCbCr color system by using the following equations (1) to (3) and the converted YCbCr color system is converted to the LCH color system by using the following equations (4) to (6). It is to be noted that in a case where the hue is acquired from the RGB data of a pixel included in the extraction position 78a when color is selected by the extraction icon 77 on the dropout color setting screen 60 as described above, the hue can be also acquired by using these equations (1) to (6).

$$Y = 0.2990 \times R + 0.5870 \times G + 0.1140 \times B \quad (1)$$

$$Cb = -0.1687 \times R - 0.3313 \times G + 0.5000 \times B \quad (2)$$

$$Cr = 0.500 \times R - 0.4187 \times G - 0.0813 \times B \quad (3)$$

$$H = 180/\pi \times \tan(Cb/Cr) \quad (4)$$

$$C = (Cr^2 + Cb^2)^{(1/2)} \quad (5)$$

$$L = Y \quad (6)$$

If the hue H of the judgment pixel has been acquired in the above manner, a value 1 is set to a variable n (step S330). Then, a hue range HRn of the specified color number n is read (step S340). Note that the number n corresponds to a specified color number on the dropout color setting screen 60 and is a number of values 1 to 5 in the embodiment. Then, it is judged whether the acquired hue H is in a range of the read hue range HRn or not (step S350). If it has been judged that the acquired hue H is in the range, the selected judgment pixel is set to a dropout target pixel of the specified color number n (step S360). On the other hand, if it has been judged that the acquired hue H is not in the hue range HRn, the variable n is incremented by a value 1 (step S370) and it is judged whether the variable n is larger than a maximal value nmax (value 5) or not (step S380). If it has been judged that the variable n is not larger than the maximal value nmax at step S380, the process returns to step S340 again and a hue range HRn of a new specified color number n is read. Then, it is judged at step S350 whether or not the hue H is in a range of the hue range HRn which has been newly read. The processings at steps S340 to S380 are repeatedly performed and if it has been judged that the variable n is larger than the maximal value nmax at step S380, the selected judgment pixel is set to a non-target pixel (step S390).

If the judgment pixel has been set to either of the dropout target pixel or the non-target pixel, it is judged whether there is an un-judged pixel or not (step S400). If it has been judged that there is an un-judged pixel, the process returns to step S300 and the processings are repeated. On the other hand, if it has been judged that there is no un-judged pixel, the processing is ended. It is to be noted that the CPU 22 sets each pixel to either of the dropout target pixel or the non-target pixel and registers each value of the LCH color system obtained by the color space conversion processing in the RAM 24.

Then, returning to the dropout processing routine, the dropout target pixels are set in the above manner. Next, a processing pixel is selected (step S120) and it is judged whether the selected processing pixel is a dropout target or not (step S130). Note that the processing pixels are selected in the order from a pixel at an upper left position in the same manner as the selection of the judgment pixels as described above. Further, whether the selected processing pixel is a dropout target or not is judged by judging whether the pixel is set to either of the dropout target pixel or the non-target pixel. If it has been judged that the processing pixel is the dropout target at step S130, the color conversion processing for dropout is performed on the processing pixel so that the RGB value thereof is converted to an R"G"B" value (step S140). Each component of the converted R"G"B" value is substituted for each component of the RGB value in the above equation (1), respectively, and a gray scale processing is performed (step S150). It is to be noted that the color conversion processing for dropout in which the RGB value is converted to the R"G"B" value is described in detail later.

Figure 7:
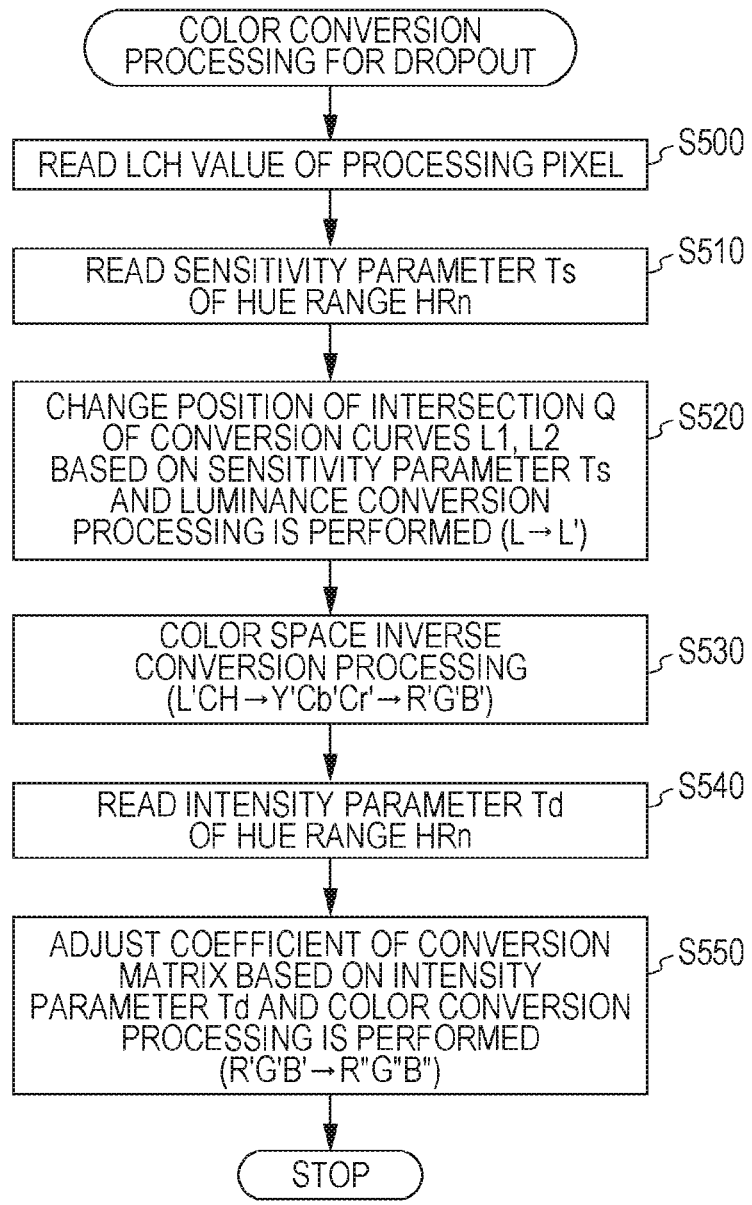
FIG. 7 is a flowchart illustrating an example of a color conversion processing for dropout.

On the other hand, if it has been judged that the processing pixel is not the dropout target pixel, that is, is the non-target pixel at step S130, the gray scale processing is performed by using the RGB value of the processing pixel as it is with the above equation (1) at step S150. If the gray scale processing has been performed at step S150, it is judged whether there is an unprocessed pixel or not (step S160). If it has been judged that there is an unprocessed pixel, the process returns to step S120 and the processings are repeated. On the other hand, if it has been judged that there is no unprocessed pixel at step S160, it is judged whether either of monochrome or gray is set as an output image (step S170). If it has been judged that the monochrome is set at step S170, a gradation value of each pixel which has been subjected to the gray scale processing is binarized (step S180). Then, the binarized image is output (step S190) and this routine is ended. On the other hand, it has been judged that the gray is set at step S170, a grayscale image is output (step S200) and this routine is ended. Hereinafter, the color conversion processing for dropout is described in detail. FIG. 7 is a flowchart illustrating an example of the color conversion processing for dropout.

Figure 8A:
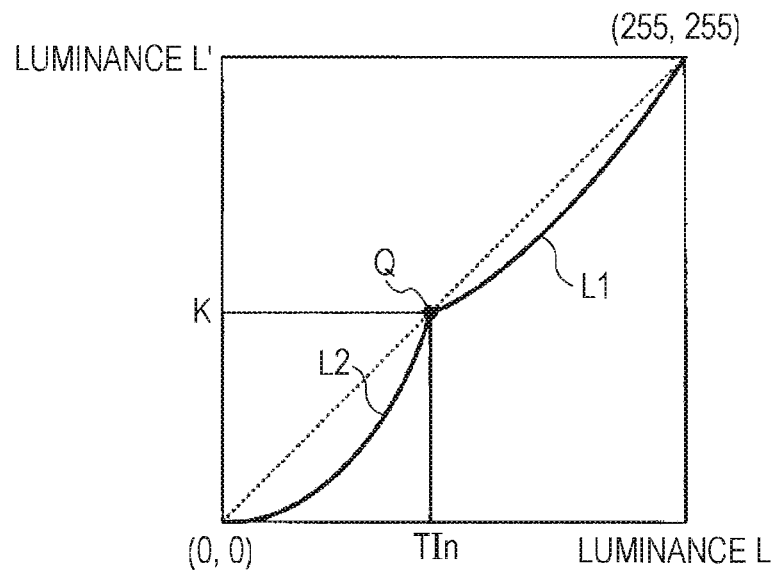
FIGS. 8A and 8B are descriptive graphs illustrating conversion curves used for a lightness conversion processing.
Figure 8B:
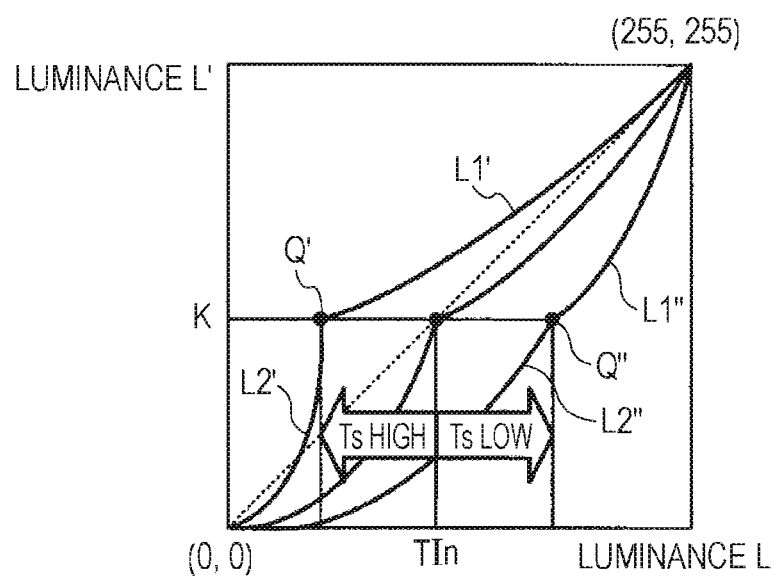

In the color conversion processing for dropout, at first, each value of the LCH color system of the processing pixel is read (step S500) and the sensitivity parameter Ts which has been registered so as to correspond to the hue range HRn is read (step S510). Next, a position of an intersection Q of conversion curves L1, L2 is changed based on the read sensitivity parameter Ts, and a lightness conversion processing is performed on a lightness L by using the conversion curves L1, L2 of which intersection Q has been changed (step S520). FIGS. 8A and 8B are descriptive graphs illustrating the conversion curves L1, L2 used for the lightness conversion processing. As illustrated in FIG. 8A, the horizontal axis indicates an input lightness L and the vertical axis indicates an output lightness L'. An intersection of the conversion curve L1 and the conversion curve L2 is referred to as the intersection Q. The conversion curve L1 is a curve for converting the lightness L at the high lightness side to the lightness L'. The conversion curve L2 is a curve for converting the lightness L at the low lightness side to the lightness L'. The intersection Q can be moved in the horizontal direction in the drawing based on the value of the sensitivity parameter Ts. That is to say, if the position of the intersection Q is expressed in coordinates (TIn, K (K is a constant number)), a value of TIn can be adjusted by the sensitivity parameter Ts. To be more specific, as illustrated in FIG. 8B, as the sensitivity parameter Ts is made larger, the value of TIn becomes smaller and the intersection Q is moved in the left direction in the drawing (for example, intersection Q'). In this case, in particular, the lightness L at the low lightness side is converted to a higher lightness L' by the conversion curve L1'. On the other hand, as the sensitivity parameter Ts is made smaller, the value of TIn becomes larger and the intersection Q is moved in the right direction in the drawing (for example, intersection Q"). In this case, in particular, the lightness L at the low lightness side is converted to a lower lightness L' by the conversion curve L2". As described above, it is understood that the lightness conversion processing using the conversion curves L1, L2 serves as a color gamut compression processing of compressing a range of a histogram of the lightness L. For example, when there is color gradation on background of an image and the dropout is desired to be performed uniformly, if the sensitivity parameter Ts is set to be high, the lightness L at the low lightness side is converted to the lightness L' at the high lightness side. Accordingly, the lightness of the pixels on the background can be converted to a uniform lightness. With this, pixels on the background can be uniformly dropped out. Further, when a character in an image is not desired to be dropped out, if the sensitivity parameter Ts is set to be low, the lightness L at the low lightness side where the character is present can be converted to the lightness L' at the lower lightness side. This is because the character has a lightness lower than that on the background at the same hue in many cases. With this, the character on the image can be left without being dropped out. Since such adjustment of the sensitivity parameter Ts can be set for each hue range, a dropout effect desired by a user can be provided for each target color subjected to the dropout processing.

If the lightness conversion processing has been performed in the above manner, a color space inverse conversion processing is performed (step S530). The inverse conversion processing is performed in the following manner. That is, the lightness L' after the lightness conversion processing, chroma C, and hue H are converted to the YCbCr color system (Y'Cb'Cr') by using the following equations (7) to (9). Then, the converted Y'Cb'Cr' is converted to the RGB color system (R'G'B') by using the following equations (10) to (12).

$$Y' = L' \quad (7)$$

$$Cb' = C \times \sin(H \times \pi / 180) \quad (8)$$

$$Cr' = C \times \cos(H \times \pi / 180) \quad (9)$$

$$R' = Y' + 1.402 Cr' \quad (10)$$

$$G' = Y' - 0.344 Cb' - 0.714 Cr' \quad (11)$$

$$B' = Y' + 1.773 Cb' \quad (12)$$

If the color space inverse conversion processing has been performed in the above manner, the intensity parameter Td which has been registered so as to correspond to the hue range HRn is read (step S540). Next, coefficients of a conversion matrix are adjusted based on the read intensity parameter Td and the color conversion processing is performed using the adjusted conversion matrix (step S550). At this time, at first, the intensity parameter Td is input to an adjustment matrix (dIntensity) as expressed in the following equation (13) so that a value of the adjustment matrix (dIntensity) is defined. Next, each of coefficients d1', d2', d3' of the conversion matrix is calculated by multiplying the adjustment matrix (dIntensity) by each of reference coefficients d1, d2, d3, which will be described later, by using the following equation (14). Then, R"G"B" are obtained by multiplying the R'G'B' obtained by the inverse conversion processing at step S530 by the conversion matrix by using the following equation (15). The color conversion processing at step S550 is performed in the above manner and the R"G"B" obtained by the processing are used for the gray scale processing at step S150 in the above dropout processing routine.

$$[dIntensity] = \begin{pmatrix} 1+(Td/100)(2/3) & -(Td/100)(1/3) & -(Td/100)(1/3) \\ -(Td/100)(1/3) & 1+(Td/100)(2/3) & -(Td/100)(1/3) \\ -(Td/100)(1/3) & -(Td/100)(1/3) & 1+(Td/100)(2/3) \end{pmatrix} \quad (13)$$

Td: intensity parameter ($-100 \leq Td \leq 100$)

$$\begin{pmatrix} d1' \\ d2' \\ d3' \end{pmatrix} = [dIntensity] \begin{pmatrix} d1 \\ d2 \\ d3 \end{pmatrix} \quad (14)$$

$$\begin{pmatrix} R'' \\ G'' \\ B'' \end{pmatrix} = \begin{pmatrix} d1' & d2' & d3' \\ d1' & d2' & d3' \\ d1' & d2' & d3' \end{pmatrix} \begin{pmatrix} R' \\ G' \\ B' \end{pmatrix} \quad (15)$$

An example of the reference coefficients d1, d2, d3 for the color conversion is illustrated in FIG. 9. As illustrated in FIG. 9, values of the reference coefficients d1, d2, d3 are defined for each color. For example, in the case of red and pink, the reference coefficient d1 is set to a value 1 and the reference coefficients d2, d3 are set to a value 0. Since a value of R(R') is originally high in the case of red and pink, it is recognized from the above equations (13) to (15) that the color conversion processing in which the high value of R(R') is reflected is performed. That is to say, the coefficient values are defined such that the gradation value when the pixel is subjected to the gray scale processing is higher. Further, the coefficient values are defined for other colors in the same manner. On the other hand, the adjustment matrix (dIntensity) is a matrix for deriving the coefficients d1', d2', d3' of the conversion matrix such that as the intensity parameter Td is larger, a higher gradation value is obtained. Therefore, as the intensity parameter Td is made larger, the gradation values of the pixels which have been subjected to the gray scale processing are uniformly made higher so that the pixels can be easily dropped out. Such adjustment of the intensity parameter Td can be set for each hue range. Therefore, a dropout effect desired by a user can be uniformly provided for each target color subjected to the dropout processing. Note that which color the hue range HRn mainly expresses can be defined by using a value of the hue. For example, the median of the hue range HRn and the medians of representative hue ranges of each color are compared. Then, the color that the hue range HRn mainly expresses is defined to the color of which median of the hue range is the closest to that of the hue range HRn. Therefore, it is sufficient that the reference coefficients d1, d2, d3 in FIG. 9 are selected in accordance with the color expressed by the hue range HRn.

Next, correspondence between the components according to the embodiment and the components according to the invention is made obvious. The CPU 22 according to the embodiment which reads out the driver 25a and displays the dropout color setting screen 60 on the display unit 27 corresponds to "acceptance screen display unit". The CPU 22 according to the embodiment which switches display on the adjustment field 65 of the dropout color setting screen 60 with the operation of the radio buttons 65a to 65e corresponds to "display switching unit". The CPU 22 according to the embodiment which accepts various settings of the slider 69 on the hue bar 68, the sensitivity slide bar 71, and the intensity slide bar 72 on the adjustment field 65 of the dropout color setting screen 60 corresponds to "setting acceptance unit".

With the scan system 10 according to the embodiment which has been described in detail above, the hue bar 68 and the plurality of sliders 69 are laid out on the adjustment field 65 of the dropout color setting screen 60. Hue which is continuously changed is displayed on the hue bar 68 in a band form and the plurality of sliders 69 set hue ranges of the plurality of target colors. Further, the radio button 65a to 65e, the sensitivity slide bar 71 for setting sensitivity, and the intensity slide bar 72 for setting intensity are laid out on a region in the direction perpendicular to the lengthwise direction of the hue bar 68. Specification of the plurality of target colors corresponding to the specified color numbers 1 to 5 can be switched with the radio buttons 65a to 65e. When the radio buttons 65a to 65e are switched, the slider 69 corresponding to the specified color number is switched to be in the active display such that the hue range HR can be set. At this time, the sliders 69 corresponding to other specified color numbers are switched to be in the non-active display. With this, setting of the hue range HR corresponding to the specified color number is accepted. Further, the settings of the sensitivity parameter Ts and the intensity parameter Td are accepted through the sensitivity slide bar 71 and the intensity slide bar 72 so that the accepted settings are registered so as to be subordinate to the hue range HR. With this, settings of the hue ranges HR of the plurality of target colors and settings of the sensitivity parameter Ts and the intensity parameter Td which are subordinate to the hue ranges HR can be accepted through the adjustment field 65 of the dropout color setting screen 60. Further, the hue bar 68 on which the hue is displayed in the band form is used. Therefore, a space required for the adjustment field 65 when the plurality of target colors are specified can be saved. As a result, settings of the plurality of target colors to be subjected to the dropout processing can be accepted with excellent operability while preventing the dropout color setting screen 60 from increasing in size.

It is needless to say that the invention is not limited to the above embodiment and the invention can be executed in various embodiments within the technical range of the invention.

In the above embodiment, the hue bar 68 on the adjustment field 65 of the dropout color setting screen 60 is laid out such that the lengthwise direction thereof corresponds to the horizontal direction. However, the layout thereof is not limited thereto and the hue bar 68 may be laid out such that the lengthwise direction thereof changes to the vertical direction.

In the above embodiment, the sliders 69 are displayed in the non-active display on the hue bar 68 on the adjustment field 65 of the dropout color setting screen 60. However, the invention is not limited thereto and those other than the slider 69 in the active display may not be displayed.

In the above embodiment, the CPU 22 reads out the driver 25a having the dropout function so as to perform the scanning processing with the dropout processing. However, the invention is not limited thereto and the CPU 22 may read out application software having a dropout function so as to perform the processing. Alternatively, the dropout function may be incorporated in the printer 30 and the controller 31 of the printer 30 may read out the dropout function so as to perform the processing. In such case, it is sufficient that the dropout color setting screen 60 is displayed on a display unit of the printer 30.

In the above embodiment, the sensitivity and the intensity can be adjusted on the dropout color setting screen 60. However, the invention is not limited thereto and a configuration in which other parameters can be adjusted may be employed. Alternatively, the adjustments of such parameters may not be accepted. In such case, in the dropout processing, for example, a pixel value of a pixel set to be a dropout target may be simply replaced by a pixel value of a white pixel or a pixel value of a background pixel.

In the above embodiment, a case where the dropout processing is performed has been described as an example. However, the invention may be applied to a case where the color enhancement processing is performed. Further, in the above embodiment, a case where a gray or monochrome image is output as the output image has been described as an example. However, the invention may be applied to a case where a color image is output.

In the above embodiment, the printer 30 as a complex machine including the printer mechanism 32 and the scanner mechanism 33 has been described as an example. However, a simple scanner machine including only a scanner mechanism without the printer mechanism 32 may be employed. Further, in the above embodiment, the ink jet printer mechanism 32 has been described as an example. However, a laser printer mechanism may be employed. Further, in the above embodiment, the scanner mechanism 33 including a well-known color image sensor which generates RGB data by resolving reflection light from a document, onto which light has been emitted, into each color of red (R), green (G), and blue (B) as a scan image has been described as an example. However, a scanner mechanism of a contact image sensor (CIS) system which includes a light source of each color of red (R), green (G), and blue (B) and a monochrome image sensor may be employed.

What is claimed is:

1. An image processing apparatus which accepts processing settings including settings of a plurality of target colors for a color conversion processing and performs color conversion relating to the accepted target colors, comprising:
    an acceptance screen display unit which displays an acceptance screen including a specification switching field on which specification of the plurality of target colors is switched, a hue range setting field constituted by a hue display portion on which hue which is continuously changed is displayed in a band form and a plurality of range setting portions for setting each hue range of the plurality of target colors, and a subordinate item setting field on which a subordinate item subordinate to each hue range is set;
    a display switching unit which executes switching in which a range setting portion corresponding to the specified target color among the plurality of range setting portions on the hue range setting field is made to be in an active display on which a hue range is capable of being set, switching in which other range setting portions are made to be in a display which is different from the active display and hue ranges are not capable of being set, and switching in which the subordinate item setting field is made to display on which a subordinate item corresponding to the range setting portion switched to be in the active display is set, when the specification of the target colors on the specification switching field is switched; and
    a setting acceptance unit which executes acceptance of setting of a hue range by using the range setting portion switched to be in the active display on the hue range setting field and acceptance of setting of a subordinate item corresponding to the accepted setting of the hue range on the subordinate item setting field.

2. The image processing apparatus according to claim 1, wherein on the acceptance screen, the specification switching field and the subordinate item setting field are laid out on a region in a direction perpendicular to a lengthwise direction of the band-form hue display portion.

3. The image processing apparatus according to claim 1, wherein on the acceptance screen, two boundaries in pairs indicating positions at both ends of the hue range are laid out for each of the plurality of range setting portions on the hue display portion,
    the display switching unit is a switching unit which switches to a display on which each of the two boundaries in pairs is slidable on an entire range on the hue display portion including ranges overlapping with other hue ranges set by the range setting portions in the display which is different from the active display as the active display of the range setting portion, and
    the setting acceptance unit is an acceptance unit which accepts setting in which a range sandwiched between the two boundaries in pairs including the ranges overlapping with the other hue ranges is set as the hue range.

4. The image processing apparatus according to claim 3, wherein on the acceptance screen, the hue display portion is formed such that hue is continuous from one end to the other end,
    the display switching unit is a switching unit which switches to a display on which when one boundary of the two boundaries in pairs switched to the slidable display is slid beyond one end of the hue display portion, the one boundary is displayed at the other end side of the hue display portion, and
    the setting acceptance unit is an acceptance unit which accepts setting in which a range from the other end to the one boundary and a range from the one end to the other boundary are set as the hue range.

5. The image processing apparatus according to claim 1, wherein on the acceptance screen, the subordinate item setting field is laid out as a field which is commonly used for settings of each of the hue ranges, and
    the setting acceptance unit is an acceptance unit which accepts a subordinate item set by using the commonly used subordinate item setting field as an item subordinate to the hue range set by the range setting portion switched to be in the active display.

6. The image processing apparatus according to claim 1, instructing an image processing apparatus which acquires hue and lightness from a gradation value of a pixel constituting a color image and performs a color conversion processing on a pixel in which the acquired hue corresponds to the hue range of the set target color as a target pixel to be processed using the acquired lightness, to perform color conversion relating to the target color,
    wherein on the acceptance screen, an item which is capable of adjusting lightness of the pixel as the target pixel to be processed for each of the hue ranges is laid out as the subordinate item setting field.

7. The image processing apparatus according to claim 1, instructing an image processing apparatus which performs a processing of dropping out the target color from a color image as the color conversion processing, to perform color conversion relating to the target color.

8. A non-transitory computer-readable medium which stores a program for making a computer function as the image processing apparatus according to claim 1.

* * * * *